T. J. SNYDER.
SHOCK ABSORBER.
APPLICATION FILED MAY 24, 1917.
1,273,011.
Patented July 16, 1918.
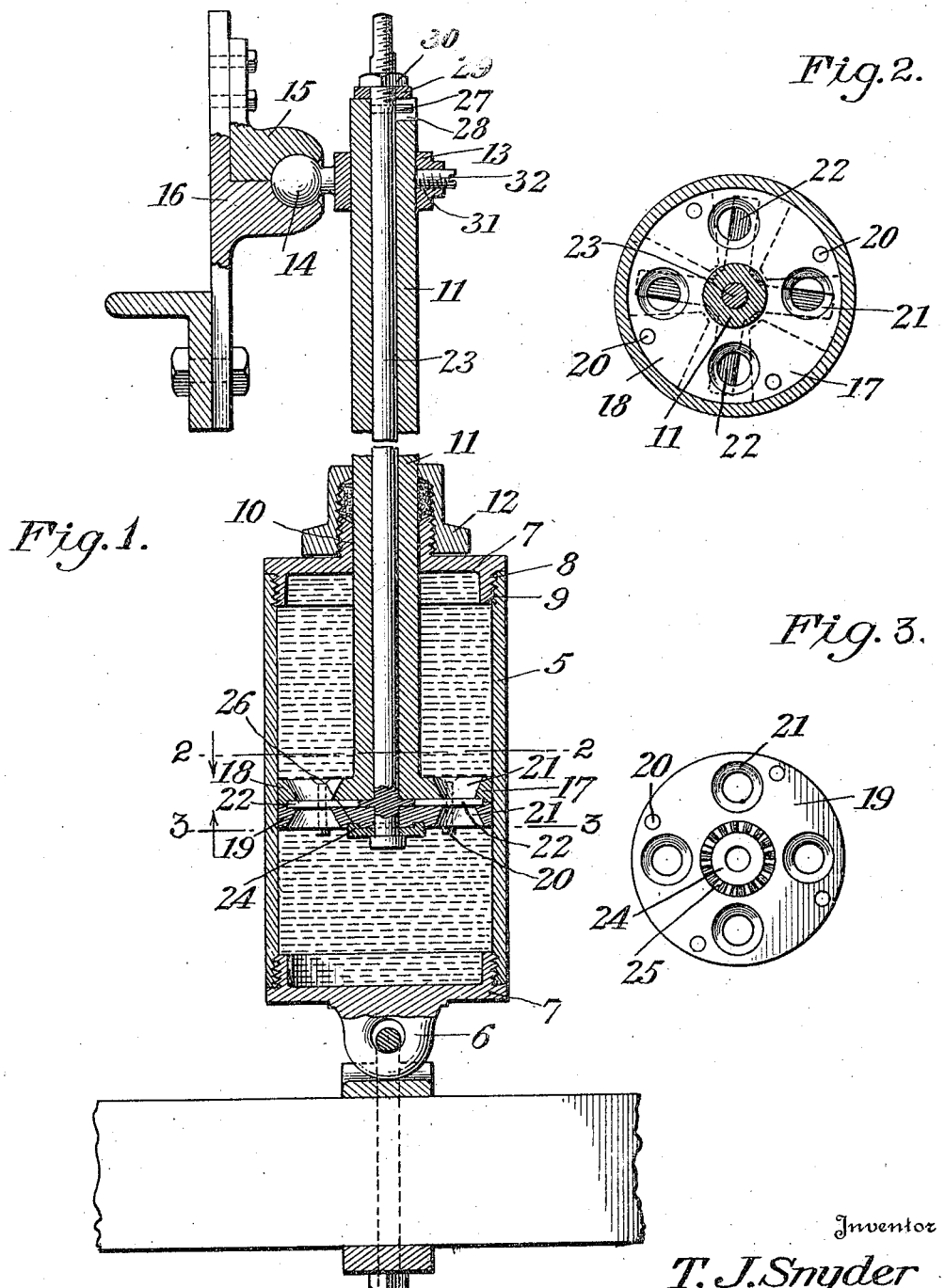

UNITED STATES PATENT OFFICE.

THOMAS J. SNYDER, OF ANATONE, WASHINGTON.

SHOCK-ABSORBER.

1,273,011.   Specification of Letters Patent.   Patented July 16, 1918.

Application filed May 24, 1917. Serial No. 170,709.

*To all whom it may concern:*

Be it known that I, THOMAS J. SNYDER, a citizen of the United States, residing at Anatone, in the county of Asotin and State of Washington, have invented certain new and useful Improvements in Shock-Absorbers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shock absorbers and particularly to shock absorbers employed in combination with the usual spring gear of a vehicle.

The object of the invention is the provision of a plunger operating in a cylinder containing oil or similar heavy fluid, the plunger having ports to permit the fluid to pass therethrough, and means carried by the plunger for opening and closing the ports.

The invention comprises various details of construction, combinations and arrangements of parts which will be hereinafter fully described, shown in the accompanying drawings and then specifically defined in the appended claim.

I illustrate my invention in the accompanying drawings, in which:—

Figure 1 is a central vertical sectional view, Figure 2 is a sectional view on line 2—2 of Fig. 1 and, Fig. 3 is a sectional view on line 3—3 of Fig. 1.

Reference now being had to the details of the drawings by numeral, 5 indicates the cylinder of the absorber, constructed of suitable material and having an integral depending apertured lug 6, formed on the base 7 thereof, said lug cooperating with securing means by which the cylinder is secured to the axle of a vehicle. The cylinder cover 7 is threaded as at 8, to coöperate with the threads 9 of the cylinder 5, whereby the same is held in position, the cover being apertured at 10 to receive the piston rod 11, while the nut 12, supported on the cover, secures a suitable rod packing to prevent leakage around the rod during the operation thereof.

The guide comprises a collar portion 13 and a ball 14 secured within the socket 15 of the bracket 16, which in turn is bolted or otherwise secured to the body of a motor vehicle.

Adjacent the lower end of the piston rod 11 is a piston 17, comprising an upper section 18 and a lower section 19, spaced apart and bolted together as at 20. These sections 18 and 19 have registering openings 21 controlled by valve member 22, operating between the sections 18 and 19, to vary the size of the openings to permit a smaller or greater amount of fluid to pass from one side of the piston to the other side thereof, during the operation of the device.

A valve rod 23 extends upwardly through the piston rod 11, the lower end thereof extending through the sections 18 and 19, to which is rigidly secured the washer 24, having teeth 25 coöperating with notches 26 formed in the under side of the piston and it will be seen that this structure will prevent movement of the central valve 22 with relation to the piston, that is when said teeth are in coöperative relation.

Adjacent the upper end of the valve rod 23 is a pin 27 movable in the slot 28, to restrict movement of the valve rod 23 with relation to the piston rod 11. A washer 29 is placed on the upper portion of the valve rod 23 and a nut 30 is threaded on the rod 23 and is adapted to draw the washer 24 into engagement with the under side of the piston to lock the rod 23 in such position as is desired.

The collar 13 is provided with a threaded aperture 31 through which the set screw 32 operates and engages the piston rod 11, to support the rod in its adjusted position.

In the operation of the device, when the plunger is forced through the cylinder, the fluid in the piston moves through the openings 21, thereby restricting the movement of the piston.

If the load on the vehicle to which the absorber is applied is increased, the valve member 22 is moved to partially close the openings with the result that the resistance in the cylinder is increased, thereby obstructing the movement of the piston and preventing the chassis from moving too suddenly. However, if the load is small, it is, of course, advantageous to have the piston move more freely through the cylinder, this being accomplished by moving the valve to open the openings 21 to their fullest extent, thereby lessening the resistance in the cylinder.

What I claim to be new is:—

A piston for cylinders of shock absorbers, said piston comprising two sections, the adjacent faces of which have recesses therein, one of said sections having a hollow integral stem and the other section apertured and provided with notches in its outer face, a disk valve seated in said recesses and having an integral rod mounted in the hollow stem, and a stub headed end passing through the aperture in the other section, a washer having teeth thereon and mounted upon said stub end and held by the head in said notches, and means for holding the sections together.

In testimony whereof I hereunto affix my signature in presence of two witnesses.

THOMAS J. SNYDER.

Witnesses:
DUNCAN A. McINTOSH,
JOHN K. McINTOSH.